United States Patent [19]
Jenson

[11] Patent Number: 4,973,969
[45] Date of Patent: Nov. 27, 1990

[54] COHERENT FREQUENCY BURST DETECTOR APPARATUS AND METHOD

[75] Inventor: Leslie M. Jenson, Vadnais Heights, Minn.

[73] Assignee: TSI Incorporated, St. Paul, Minn.

[21] Appl. No.: 464,899

[22] Filed: Jan. 16, 1990

[51] Int. Cl.$^5$ .............................................. H03K 3/78
[52] U.S. Cl. ................................................... 342/189
[58] Field of Search .................. 342/189, 389; 375/96; 324/78 R

[56] References Cited

U.S. PATENT DOCUMENTS 4,403,184  9/1983  Witt et al. ............................. 324/78
4,445,223  4/1984  Jasper et al. ........................... 375/96

Primary Examiner—Thomas H. Tarcza
Assistant Examiner—Mark Hellner
Attorney, Agent, or Firm—Merchant, Gould, Smith, Edell, Welter & Schmidt

[57] ABSTRACT

A method and apparatus for automatically detecting a coherent frequency burst is disclosed. The apparatus 10 determines the approximate frequency and duration of the burst. The apparatus 10 operates utilizing principles of autocorrelation to reject random noise and maximize the efficiency of a down stream data signal processor. The apparatus 10 includes delay means 30 which accepts a digitized signal from a device, such as a photodetector in an LDV, and generates a plurality of delayed signals. The delayed signals are then multiplied by the original signals by multiplier means 40. The multiplied signals are provided to averaging circuits 50. The averaged signals are then compared to a reference level by comparators 60, the output of which is provided to priority encoder 70. Priority encoder 70 prioritizes the signals received from comparators 60 and determines the length of the burst.

17 Claims, 4 Drawing Sheets

COHERENT FREQUENCY BURST DETECTOR APPARATUS AND METHOD

FIELD OF THE INVENTION

This invention relates generally to the detection of information in the presence of random energy, and more particularly to a circuit for automatically detecting a coherent frequency burst and for determining the approximate frequency of the burst and the duration of the burst.

BACKGROUND OF THE INVENTION

Many instruments today require digital signal processing ("DSP") to extract the maximum information from electronic signals. DSP often requires that the signal be sampled and stored in memory for a certain time period. The length of time in the period depends upon the algorithm used for DSP. In many cases, the signals of interest occur in short bursts and at random time intervals. This makes it impossible to predict in advance when the signal that contains pertinent information will be present or not present. Also, the processing time of the DSP algorithm can be long compared to the signal burst time. Thus, if a continuous block sampling technique is used, the efficiency of processing the available signal may be very low.

Although numerous measuring devices, such as radar and sonar among others, operate such that the basic signal generated by the transducer includes random bursts of coherent frequencies on a background of white noise, the example used herein will be that of the laser dopler velocimeter ("LDV"). As those skilled in the art will appreciate, the LDV operates to produce a signal indicative of the speed of a particle traversing the intersection of two laser beams. The produced signal has both a duration and a frequency which are of interest.

In the past, typically an analog level detector was utilized to determine when a burst was present in an LDV signal. However, such a system had the following drawbacks: the system detected amplitude rather than coherence, the system was amplitude dependent, the system had a low amplitude dynamic range and the system required a relatively high signal to noise ratio.

Therefore, there arises a need for a burst detector which is capable of triggering a block sampler to acquire a sample block of the desired signal. By doing so, the DSP algorithm efficiency improves significantly (i.e., the ratio between the time spent processing signals with pertinent information compared to time spent processing signals that contain no pertinent information). Also, there arises a need for a burst detector which prevents losing data due to the data occurring at a small percentage of the time. The present invention directly addresses and overcomes the shortcomings of the prior art.

SUMMARY OF THE INVENTION

The present invention provides a simple, relatively inexpensive and yet reliable method and apparatus for automatically, and continuously sensing for coherent frequency bursts. Once a burst is detected, the approximate frequency and duration is determined and passed to a block sampler of a DSP in order to efficiently analyze the burst.

In a preferred embodiment constructed according to the principles of the present invention, the incoming signal generated by an LDV or the like is applied to a double clipping device after a low pass filter to remove frequencies below the range of interest. This device creates a digital signal (i.e., either a logical plus 1 or minus 1) in response to the polarity of the incoming signal. The digital signal is provided to an auto-correlator network comprised of a series of delays and a plurality of exclusive OR gates, wherein the double clipped signal is multiplied by the various delayed digital signals. As those skilled in the art will appreciate, the auto-correlator network generates signals which are an indication of the general dependence of the values of the data at one time on the values at another time. Therefore, for random noise, the auto-correlated signal will approach zero for any particular time.

The multiplied signals are each provided to a corresponding reference level detector network comprised of an averaging circuit and a comparator. As noted, the autocorrelated signal will approach zero for any given time. Therefore, the reference level detector network is arranged and configured such that the signal will not trigger any of the plurality of reference level detectors in the detection network unless a coherent burst is present.

The outputs of the reference level detectors are then supplied to a priority encoder which determines the first (i.e., prioritizes) time delay associated with a reference level detector which is triggered. This determination provides an approximate frequency of the burst due to approximate frequencies being associated with certain correlation coefficients (i.e., time delays). Further, the priority encoder provides the duration of the burst by determining how long the prioritized reference level detector is triggered.

Therefore, according to one aspect of the invention, there is provided a device to detect the presence of a coherent frequency burst superimposed on a signal, the device comprising:
(a) auto-correlation means for generating the auto correlation coefficients of the signal; and
(b) means for determining a first negative peak on said auto-correlation coefficients, said first negative peak having an amplitude, wherein said amplitude is, generated by the coherent frequency in the burst.

According to a further aspect of the invention, there is provided an apparatus as recited above, wherein said means for determining the first negative peak includes means for averaging and determining whether said negative peak is less than a reference value, wherein noise is rejected, and whereby the auto-correlation curve of the coherent frequency burst produces a peak while the auto-correlation function of the noise tends to diminish to a minimum value.

According to another aspect of the invention, there is provided a device for detecting coherent frequency bursts being carried on a noisy signal, the device comprising:
(a) delay means, cooperatively arranged to receive the noisy signal, for delaying the noisy signal in increments and generating a plurality of delayed noisy signals;
(b) multiplier means, cooperatively connected to said delay means and arranged to receive the noisy signal, for multiplying the noisy signal by the delayed noisy signals to generate a plurality of first signals;

(c) averaging means, cooperatively connected to said multiplier means, for averaging said first signals;

(d) peak detector means, cooperatively connected to said averaging means, for comparing said averaged first signals against a reference level, wherein said reference level is arranged and configured so as to detect peaks representing coherent bursts, said peak detector means selectively generating second signals in response to detected peaks; and (e) priority encoder means, cooperatively connected to said peak detector means, for determining which second signal is associated with the shortest delayed noisy signal and for determining the length of the second signal, whereby the approximate frequency and length of the coherent frequency burst may be determined.

According to still another aspect of the invention there is provided a method to detect the presence of a coherent frequency burst superimposed on a signal, comprising the steps of:

(a) generating the autocorrelation coefficients of the signal; and (b) determining a first negative peak on the autocorrelation coefficients, said first negative peak having an amplitude, wherein said amplitude is generated by the coherent frequency in the burst.

While the invention will be described with respect to a preferred embodiment circuit configuration and with respect to particular circuit components used therein, it will be understood that the invention is not to be construed as limited in any manner by either such circuit configurations or circuit components described herein. Also, while the particular types (i.e., such as CMOS-type) circuit components will be described with respect to the description of a preferred embodiment to the invention, it will be understood that such particular circuit types are not to be construed in a limiting matter. Further, while the preferred embodiment of the invention will be described in relation to a LDV device and method as applicable to the preprocessing of input signals to an LDV processor, it will be understood that the scope of the invention is not to be limited in any way by the circuit or preprocessing environment in which it is employed. The principles of this invention apply to the detection of frequency bursts so as to automatically provide an indication of the frequency of the burst and the duration of the burst, for subsequent use by any type of electronic equipment requiring the processing of such bursts. These and other variations of the invention will become apparent to those skilled in the art upon a more detailed description of the invention.

These and various other advantages and features which characterize the invention are pointed out with particularity in the claims annexed hereto and forming a part hereof. However, for a better understanding of the invention, its advantages and objectives obtained by its use, reference should be had to the drawing which forms a further part hereof and to the accompanying descriptive matter, in which there is illustrated and described a preferred embodiment to the invention.

BRIEF DESCRIPTION OF THE DRAWING

Referring to the drawing, wherein like numerals represent like parts throughout the several views.

DETAILED DESCRIPTION OF A PREFERRED EMBODIMENT

As mentioned above, the principles of this invention apply to the automatic detection of coherent frequency bursts superimposed on noise or another coherent signal. The coherent frequency burst detector of the present invention provides the approximate frequency of the coherent frequency burst and the duration in order to allow a processor to efficiently process the burst. This invention, in a sense, provides a "preprocessor" network for insuring that the downstream processor samples only those blocks of data on which information is carried. A preferred application for this invention is in the monitoring and processing of coherent frequency bursts applied to the input of an LDV processor as used, for example, in detection of particles. Such application is typical of only one of innumerable types of applications in which the principles of the present invention can be employed.

Figure 1:
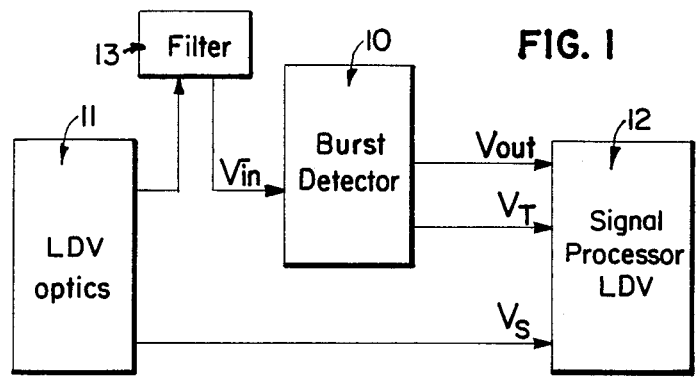
FIG. 1 is a functional block diagram of an environment in which the coherent frequency detector practicing the principles of this invention might be utilized.

Referring first to FIG. 1, there is illustrated a coherent frequency burst detector 10 utilized as a preprocessor to LDV signal processor block 12. LDV optics 11 is comprised of laser beams establishing an interference pattern, light collection optics and a photodetector (not shown). By way of example, LDV signal processor block 12 and LDV optics 11 may be of the type manufactured by TSI Incorporated of St. Paul, Minnesota, assignee of the present invention, having model number designations of 1990B and 9100-1 respectively. While those skilled in the art will appreciate and understand the operation of LDV signal processor block 12 and LDV optics 11 since they are well known in the art, a brief description will follow.

LDV optics 11 represents a system that creates electronic signals that occur in short bursts at random time intervals. In such a system, a burst detector 10 can be used to improve the LDV processor 12 efficiencies greatly. In an LDV system, a pair of laser beams (not shown) are crossed at a point in space. At the crossing point an interference pattern is created. As a small particle(s) suspended in a sample fluid passes through the interference pattern, a coherent pattern of light is scattered in all directions. The scattered light is then optically collected and converted into an electronic signal by means of a photodetector (not shown). The electronic signal is then provided to burst detector 10 via filter 13 as $V_{in}$ and to signal processor LDV 12 as $V_s$. The photodetector output is continuous, but is only meaningful when a particle is actually passing through the interference pattern of the laser beams. Dependent upon the concentration of particles in the sample fluid, this may be less than one percent of the time. By employing burst detector 10 to trigger the block sampler (not shown), only that signal at the time a particle is passing through the fringe spacing will be captured and fed to LDV signal processor 12 (i.e., the DSP).

For general use with the DSP, the burst detector is used to trigger a sampling circuit which will sample the signal at regular time intervals. An analog to digital conversion of the sampled signal is then performed with the digital information being stored in memory for the DSP to operate on. The burst detector 10 is used to insure that only the useful data is sampled and fed to the DSP for processing. In the LDV example, the frequency is directly proportional to the velocity of the particle traversing the intersection of the two laser beams. Therefore, the frequency contained in the burst is of interest.

Continuing with the LDV example, those skilled in the art will appreciate that the frequency within a single burst is essentially constant, but can vary by a factor of ten or more between bursts. The length of the bursts can vary from ten cycles to fifty or more depending on the optical arrangement of the LDV system and the path of the particle through the interference pattern. It is desirable to measure the frequency of each burst independent of the previous one. In addition, it is important to optimize the ability to extract the signal from the background noise while still providing a high degree of accuracy in the frequency measurement.

The technique used for determining the frequency of a signal buried in noise is typically either a correlator or a spectrum analyzer. However, these instruments require a relatively long processing time. In addition, to optimize accuracy and minimize cost, it is highly desirable to set the input sampling frequency at an optimum value for the signal frequency to be analyzed. These requirements dictate the need for a fast preprocessor to determine when the coherent frequency burst is present (i.e., so time is not spent processing noise) and its approximate frequency. The burst detector 10 provides these functions, while additionally providing a signal that can be used to measure the length of the burst. Knowing the length of the burst is oftentimes necessary for bias correction when using an LDV.

As those skilled in the art will recognize, an autocorrelation function is defined as follows:

$$R_x(\tau) = \lim_{T \to \infty} \frac{1}{T} \int_O^T x(t) \times x(t+\tau) dt$$

The quantity $R_x(\tau)$ is always a real-valued even function with a maximum at $\tau=0$ and may be either positive or negative. When used in the present invention, the autocorrelation function, in essence, provides for an indication of a coherent frequency burst while not triggering for noise.

Figure 2:
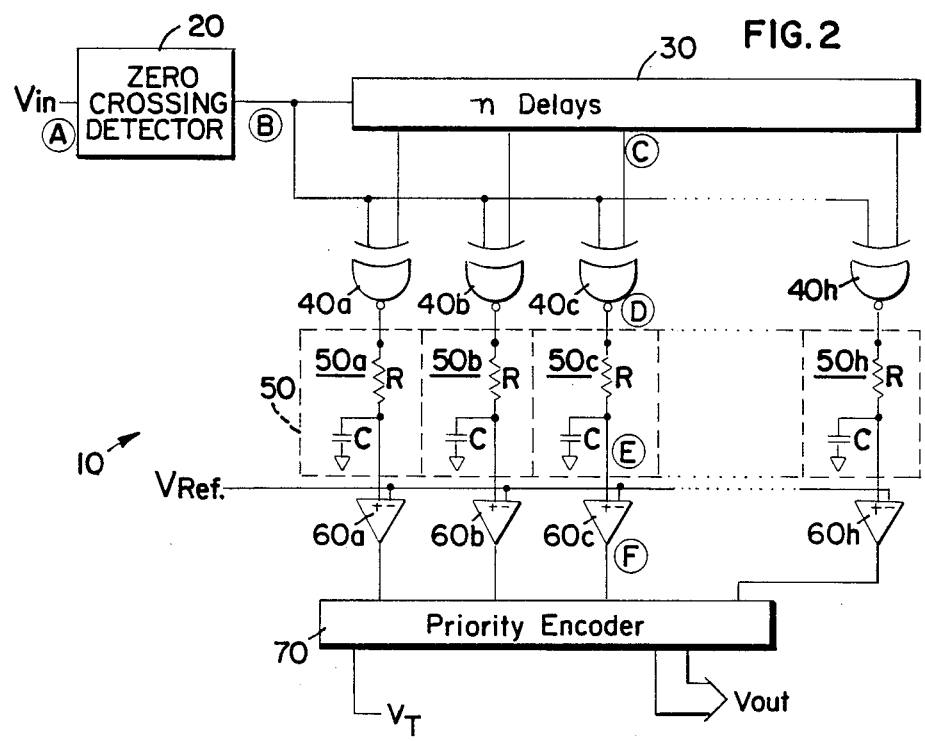
FIG. 2 is a schematic diagram of a preferred circuit configuration that practices the principles of this invention.

Turning next to FIG. 2, there is illustrated a preferred apparatus for implementing the present invention. The coherent frequency burst detector is illustrated generally at 10. The coherent frequency burst detector 10 is comprised of several functional elements. The first is a digitizer means comprised of double clipping device 20. In the preferred embodiment double clipping device 20 is a zero crossing detector. In the preferred embodiment, the zerocrossing detector is of the comparator type, manufactured by Advanced Micro Devices of Sunnyvale, California having a model number designation of AMD 687.

Double clipping device 20 converts the analog input signal $V_{in}$ from LDV optics 11 to a signal that is a digital plus one when the input is above zero and a negative one when the signal is below zero. Double clipping acts as a simple way to convert the analog signal $V_{in}$ to a digital signal while, in this case, losing very little useful information. As those skilled in the art will recognize, by way of example, double clipping converts a sine wave to a square wave. Those skilled in the art will also appreciate that other digitizing techniques might also be utilized.

Still referring to FIG. 2, the double clipped signal is then fed to delay means having "n" delays. The delay means are comprised of a delay line 30 (e.g., a shift register) or some other method of creating a delayed signal.

Those skilled in the art will easily recognize how to utilize shift registers to create a delay line. By way of example, the following table illustrates typical parameters associated with the delay line 30 and averaging network 50 (described below):

TABLE 1

| DELAY SHIFTS | OUT-PUT | DOPPLER FREQ. | CUTOFF FREQ. | RES. OHMS | CAP. (pf) |
|---|---|---|---|---|---|
| 15 | 8 | 2.3 MHZ | 115 KHZ | 42 | 82000 |
| 19 | 9 | 1.85 MHZ | 93 KHZ | 52 | 82000 |
| 23 | 10 | 1.52 MHZ | 76 KHZ | 63 | 82000 |
| 27 | 11 | 1.30 MHZ | 65 KHZ | 75 | 82000 |
| 31 | 12 | 1.10 MHZ | 55 KHZ | 89 | 82000 |
| 39 | 13 | 89.0 KHZ | 45 KHZ | 108 | 82000 |
| 47 | 14 | 75.0 KHZ | 37 KHZ | 131 | 82000 |
| 55 | 15 | 64.9 KHZ | 32 KHZ | 152 | 82000 |

In the preferred embodiment, each delay is equal to 14.3 nanoseconds. Further, the shift and the delay are equal. The foregoing table is set forth for the purpose of illustration and should not be construed as limiting the invention in any way. Those skilled in the art will recognize that any number of different shift delays and frequencies may be utilized in this invention.

Subsequent to each delay increment, the signal is provided to an exclusive OR gate 40 along with the original signal. The exclusive OR gate 40 acts as a multiplier. The output is also inverted by exclusive OR gate 40 (i.e., the NOR output is used) wherein the output is negative when the two inputs are opposite, but positive when both inputs are the same logic level. Each exclusive OR gate 40 is associated with a particular delay. For example, if n=8, then there are eight exclusive OR gates 40a, 40b, 40c, ... 40h.

The output of each OR gate 40a–40h is provided to an averaging network 50a–50h respectively. Each averaging network 50 is comprised of a resistor 51 and capacitor 52. The time constant of each RC circuit is selected to provide a one pole filter with a cutoff frequency approximately equal to 1/20 the frequency detected by that associated delay. Example values are set forth above in Table 1.

Each averaging network 50a–50h is connected to a comparator 60a–60h. When an averaged signal goes sufficiently negative, the appropriate comparator 60 is triggered, thereby sending a signal to priority encoder 70. $V_{ref}$ provides the reference lever for the comparators 60a–60h.

Priority encoder 70 evaluates each of the signals provided by comparators 60a-60h and determines the minimum delay. Priority encoder 70 then provides two signals to the processor 12. The first signal, $V_{out}$, identifies the shortest time delay that corresponds to a given frequency. Those skilled in the art will recognize that digitized representation of the appropriate time delay may be generated either serially or in parallel. The processor 12 then utilizes this approximate frequency to determine the optimum sample rate which can be set on the processor 12. The second signal $V_t$ is a signal that can be used to trigger a block sample and can also be timed to measure the length of the burst. In the preferred embodiment, the priority encoder 70 is manufactured by National Semiconductor of Santa Clara, Calif. having a part designation 74F148.

While not specifically detailed in FIG. 2, it will be understood that the functional blocks, and other devices are properly connected to appropriate bias and reference supplies so as to operate in their intended matter. Further, a low pass filter 13 (best seen in FIG. 1) may be utilized to remove frequencies below the range of interest. Additionally, for bursts carried on a coherent signal, other filters might be utilized at filter block 13 to filter out the carrier signal, leaving those burst frequencies for preprocessing by burst detector 10.

Figure 3:
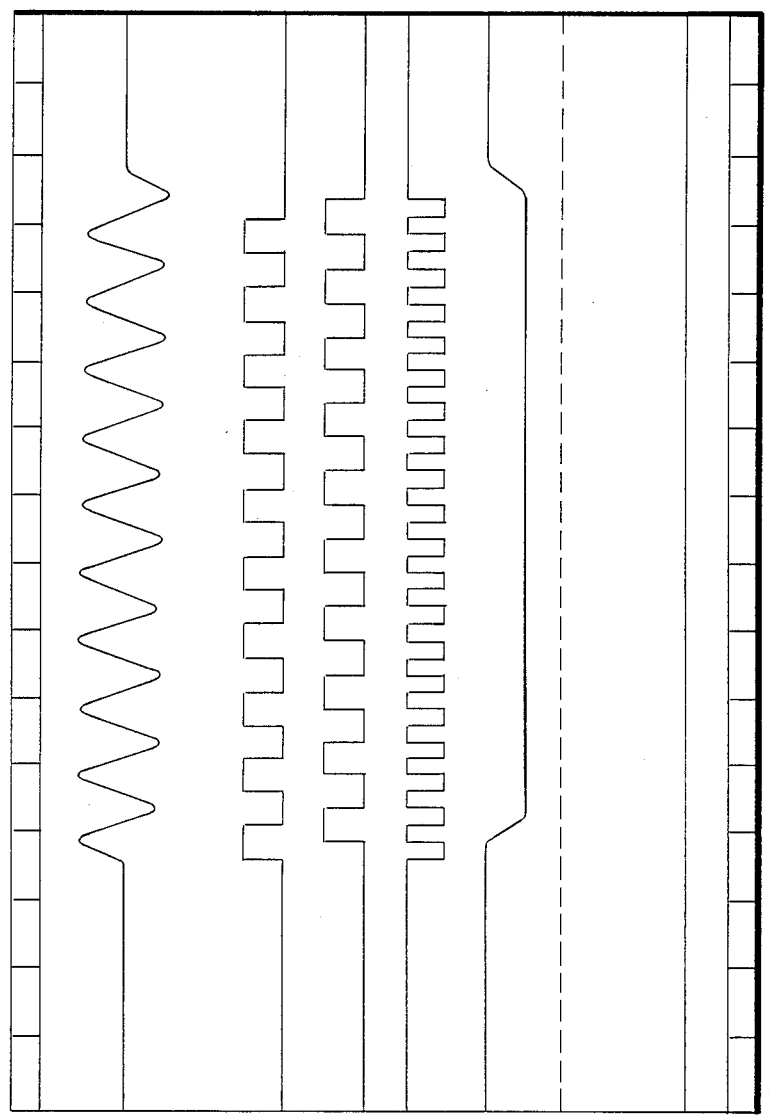
FIG. 3 is a graphical illustration of the signal representations appearing at various nodes of the circuit of FIG. 2 selected at a time delay associated with a 90° phase shift for the burst.
Figure 4:
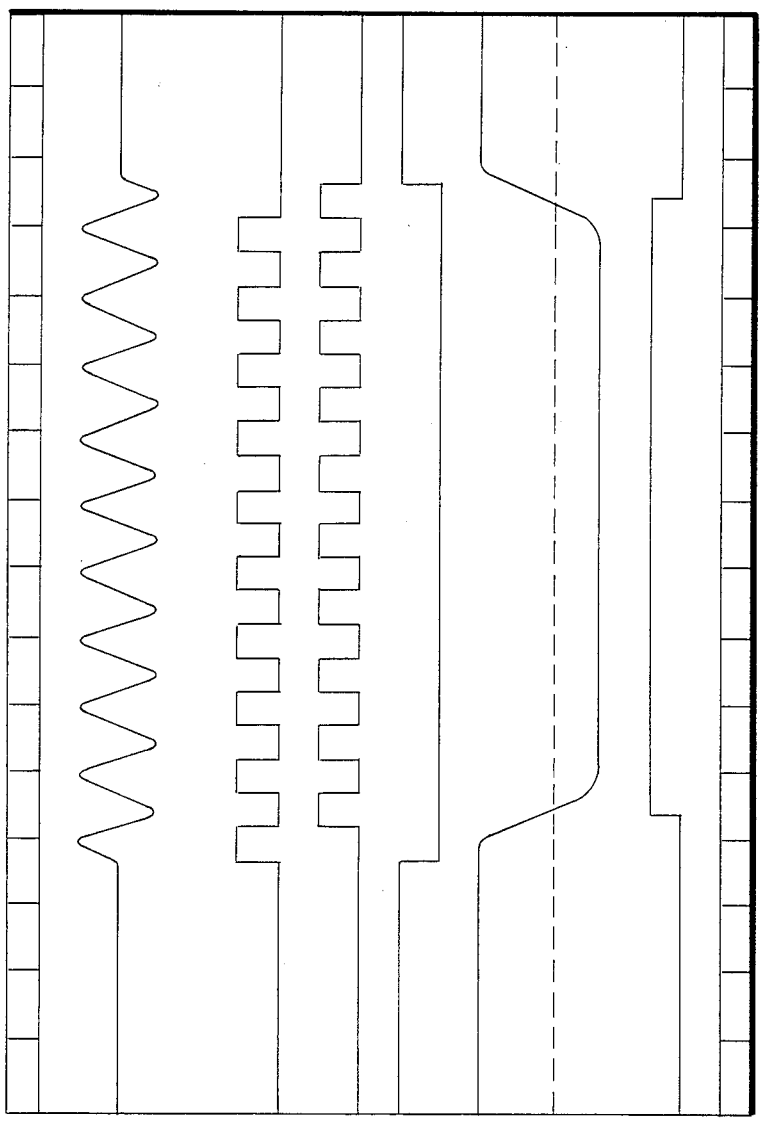
FIG. 4 is a graphical illustration of the signal representations appearing at various nodes of the circuit of FIG. 2 selected at a time delay associated with a 180° phase shift for the burst.

FIGS. 3 and 4 graphically illustrate the signal at several nodes A-F (illustrated in FIG. 2) for a coherent frequency burst. In FIG. 3, there is illustrated the signal at a delay "m" (i.e., at a predetermined delay chosen from the n delays) selected for a 90° phase shift. As can be seen at point E, the time averaged signal does not exceed the reference level. However, in FIG. 4, there is illustrated the signal at a delay "p" selected for a 180° phase shift. As can be seen in the latter figure, at a 180° phase shift, the exclusive OR signal is at its maximum (i.e., since it is a logic function of either but not both) and the time averaged signal exceeds the reference level. Therefore, FIGS. 3 and 4 graphically illustrate to those skilled in the art how approximate frequency ranges may be associated with time delays corresponding to 180° phase shifts.

Figure 5:
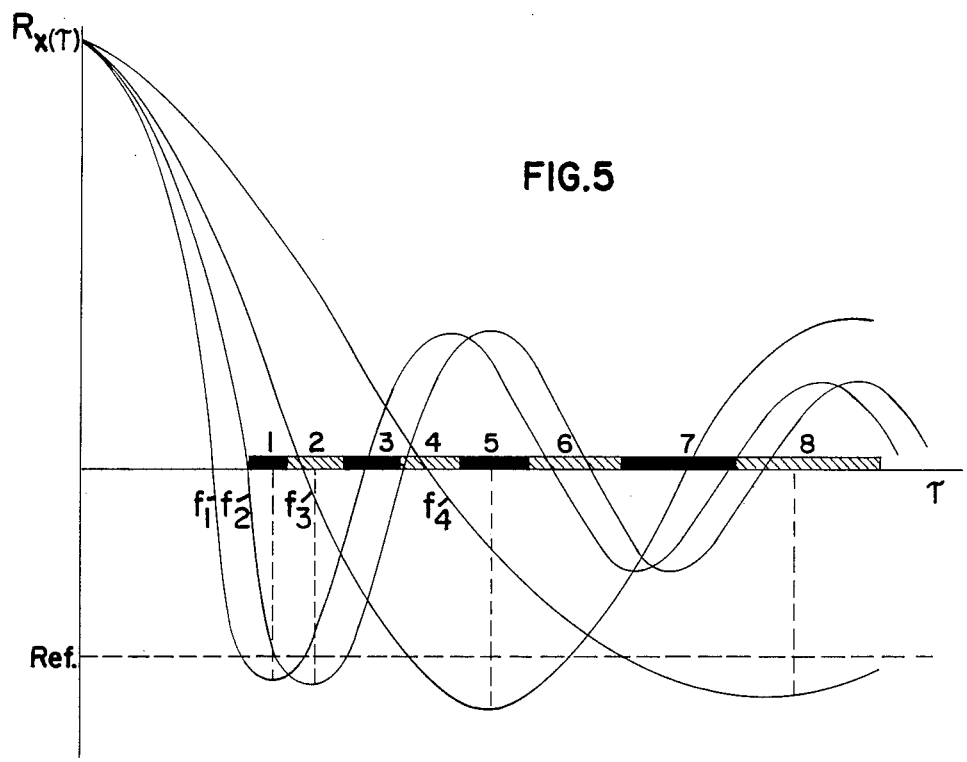
FIG. 5 is a graphical illustration of the autocorrelation curves of various frequency bursts with representative time delay increments indicated.
Figure 6:
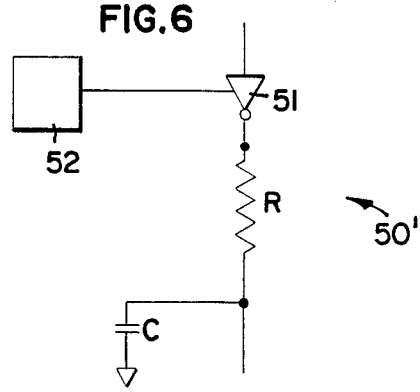
FIG. 6 is an example of a circuit which may be utilized to switch the averaging times of averaging means 50 to provide for varying the frequency ranges of the burst detector 10.

Turning next to FIG. 5, there is illustrated a plotting of the autocorrelation coefficients of several coherent frequency bursts. Although in FIG. 5 eight delays are illustrated, any number of delays might actually be utilized. In this example, each delay is 22% longer than the previous one, providing a logarithmic, or constant, percentage scale in a four to one range. As those skilled in the art will appreciate, the percent difference between the delay ranges determines how accurately the frequency may be identified. The percent difference also determines the variation and sensitivity as a function of frequency, in this example being less than 10%.

Still referring to FIG. 5, by way of example, it may be seen that the frequency $F_2$ would be sensed by the first delay, the second delay, and the third delay. The priority encoder 70 would prioritize the first delay. In a similar manner, $F_3$ would be sensed by the fourth, fifth and sixth delay (prioritizing on the fourth delay) and $F_4$ by the seventh and eighth delay (prioritizing on the seventh).

Referring once again to FIG. 4 which graphically illustrates an example output of an averaging circuit 50 when a coherent signal of appropriate frequency occurs (i.e., the signal at node E). The "burst time" is that time that the averaged signal value is below the reference. Those skilled in the art will recognize that this reference level $V_{ref}$ may be adjustable. If $V_{ref}$ is adjustable, then the minimum signal to noise ratio of an acceptable signal may be set by an operator.

Using the coherent burst detector 10, the downstream signal processor 12 only analyzes real signals and the input sampling rate can be optimized to the frequency of the burst. In addition, the burst length can be used for bias correction as well as to reject any signal of inadequate burst length. Besides reducing costs and improving accuracy, it also allows essentially complete automation of the signal processing by the coherent burst detector 10 information.

While the above described apparatus utilizes double clipping device 20 such that only digital signals are used for analysis, the present invention can also be implemented entirely with analog electronics. In an analog system, the input $V_{in}$ would be provided to an analog delay line (not shown). The exclusive OR gates 40 would be replaced with analog multipliers (not shown). Each of the foregoing analog equivalents are well known to those skilled in the art. The remaining elements of the system may be implemented similar to that illustrated in FIG. 2. Further, while more information from the autocorrelation (e.g., use of the second and third negative peaks) might be used to detect the burst, the preferred embodiment uses only the first negative peak to optimize simplicity, while losing very little in accuracy and sensitivity.

Still further, if the coherent burst detector 10 uses delay increments which are close together (e.g., a factor of 1.2 apart), it takes a large number of delay increments to cover a potential 100,000 to 1 range. To reduce this to a more practical number (e.g., such as 16), it is useful to switch ranges. However, when the timing of the shift register (i.e., delay means 20) is changed, then the time constant of the averaging circuits 50a-50h must also be changed. As those skilled in the art will appreciate, switching the value of either a resistor or capacitor as utilized in the preferred embodiment is not convenient.

This problem may be solved however, by using alternative averaging means circuit 50' comprising a digital inverter and tri-state control 51 along with a timing circuit 52 driven from a sampling clock (not shown) as illustrated in FIG. 7. For the highest range, the switch is on 100% of the time. For a range ten times lower in frequency, the switch would be on only 10% of the time. This provides the same result as increasing the value of the product of the resistor and capacitor a factor of ten, however, it is much more cost effective to implement. Those skilled in the art will appreciate that the output of exclusive OR gates 40 does not need to be inverted when using digital inverter 51, since that function is accomplished by the digital inverter 51 itself.

In the actual realization for LDV, the burst may not be analyzed unless the averaging circuit output stays below the reference level $V_{ref}$ for a fixed number of cycles. In this way, the LDV processor 12 does not waste time trying to analyze a signal that is either (a) a very short burst, or (b) random noise that was coherent long enough to cause the average to go below the reference for a short time. Also, after the first set number of cycles, the priority encoder then picks the shortest time delay that is below the reference level.

The preferred burst detector 10 described above is optimized for maximum performance with the least amount of electronic components required to implement the desired preprocessing function. The amount of electronics is minimized by one bit digitizing the incoming signal. This reduces the required electronic components, but gives up a certain degree of performance. The burst detector 10 could also be implemented using multi-bit digitalization of the signal to compute the autocorrelation coefficients. This can be done in many ways as will be evident to those skilled in the art. One such method is to replace the delay line by a multi-bit delay line (not shown) which accepts n-bit words. The exclusive OR gates 40 used as multipliers would be replaced by n-bit multipliers (not shown). This would slow down the multiplication operation. Additionally, the averagers would have weighted inputs to account for the n-bit multiplication results.

It will be appreciated that the principles of this invention apply not only to the circuitry used to implement the invention, but also the method in general of automatically providing the approximate detection of frequency of coherent frequency burst and providing a time duration thereof.

While a particular embodiment of the invention has been described with respect to its application for monitoring specific LDV signals from LDV optics 11 to an LDV processor 12, it will be understood that by those skilled in the art that the invention is not limited by such application or embodiment or the particular circuits disclosed and described herein. It will be appreciated by those skilled in the art that other circuit configurations that embody the principles of this invention and other applications therefore other than as described herein can be configured within the spirit and intent of this invention. The circuit configuration described herein is provided as only one example of an embodiment that incorporates and practices the principles of this invention. Other modifications and alterations are well within the knowledge of those skilled in the art and are to be included within the broad scope of the appended claims.

I claim:

1. A device to detect the presence of a coherent frequency burst superimposed on a signal, the device comprising:
    (a) autocorrelation means for generating the autocorrelation coefficients of the signal; and
    (b) means for determining a first negative peak on said autocorrelation coefficients, said first negative peak having an amplitude, wherein said amplitude is generated by the coherent frequency in the burst, wherein said means for determining the first negative peak include means for averaging and determining whether said negative peak is less than a reference value, wherein noise is rejected, and whereby the autocorrelation curve of the coherent frequency burst produces a peak while the autocorrelation function of the noise tends to diminish to a minimum value.

2. The device of claim 1, wherein said reference value is selectively determined in accordance with the desired energy level of the expected coherent frequency burst relative to the energy level of the expected noise.

3. The device of claim 1, further comprising priority means for determining multiple peaks to increase accuracy.

4. The device of claim 1, wherein said priority means for determining the first negative peak includes means for establishing the approximate frequency represented by said negative peak, whereby the approximate frequency of the coherent frequency burst may be determined.

5. The device of claim 1, wherein said autocorrelator means include time delay means for delaying the noisy signal, said time delay means arranged and configured to include delay increments providing a constant ratio between adjacent delays.

6. The device of claim 5, further comprising averaging means, cooperatively connected to said autocorrelator means and said means for determining a negative peak, for receiving the product of said delayed signals and said noise, wherein the time constant of the averaging circuit is based on the expected coherent frequency.

7. The device of claim 5, wherein the autocorrelation coefficient at each delay may be determined to be below the levels, represented by noise alone.

8. The device of claim 6, wherein said priority means includes means for determining the shortest delay increment that has an average below the level represented by noise alone.

9. The device of claim 8, wherein said priority means is comprised of an integrated digital logic circuit which provides a logic function.

10. The device of claim 8, further comprising digitizing means for digitizing the incoming noisy signal and wherein said means for averaging and determining includes an RC circuit and a comparator.

11. A device for detecting coherent frequency bursts being carried on a noisy signal, the device comprising:
    (a) delay means, cooperatively arranged to receive the noisy signal, for delaying the noisy signal in increments and generating a plurality of delayed noisy signals;
    (b) multiplier means, cooperatively connected to said delay means and arranged to receive the noisy signal, for multiplying the noisy signal by the delayed noisy signals to generate a plurality of first signals;
    (c) averaging means, cooperatively connected to said multiplier means, for averaging said first signals;
    (d) peak detector means, cooperatively connected to said averaging means, for comparing said averaged first signals against a reference level, wherein said reference level is arranged and configured so as to detect peaks representing coherent bursts, said peak detector means selectively generating second signals in response to detected peaks; and
    (e) priority encoder means, cooperatively connected to said peak detector means, for determining which second signal is associated with the shortest delayed noisy signal and for determining the length of the second signal, whereby the approximate frequency and length of the coherent frequency burst may be determined.

12. The device of claim 11, further comprising double clipping means for digitizing the incoming noisy signal.

13. The device of claim 11, wherein said multiplier means comprise exclusive OR gates.

14. The device as recited in claim 11, wherein said averaging means comprises an RC circuit and said peak detector means includes a comparator.

15. The device as recited in claim 11, further comprising range switching means, cooperatively connected to said averaging means, for providing said first signals to said averaging means in accordance with a selectable clock speed, wherein the averaged first signals are altered and the detected range of coherent frequency bursts is altered.

16. A method to detect the presence of a coherent frequency burst superimposed on a signal, comprising the steps of:
   (a) generating the autocorrelation coefficients of the signal;
   (b) determining a first negative peak on the autocorrelation coefficients, said first negative peak having an amplitude, wherein said amplitude is generated by the coherent frequency in the burst; and
   (c) averaging and determining whether said negative peak is less than a reference value, wherein noise is rejected, and whereby the autocorrelation curve of the coherent frequency burst produces a peak while the autocorrelation function of the noise tends to diminish to a minimum value.

17. A method for detecting coherent frequency bursts being carried on a noisy signal, comprising the steps of:
   (a) delaying the noisy signal in increments and generating a plurality of delayed noisy signals;
   (b) multiplying the noisy signal by the delayed noisy signals to generate a plurality of first signals;
   (c) averaging said first signals;
   (d) comparing said averaged first signals against a reference level, wherein said reference level is arranged and configured so as to detect peaks representing coherent bursts, and wherein second signals in response to detected peaks are selectively generated; and
   (e) determining which second signal is associated with the shortest delayed noisy signal and determining the length of the second signal, whereby the approximate frequency and length of the coherent frequency burst may be determined.

* * * * *